United States Patent [19]
Okawauchi

[11] Patent Number: 5,537,987
[45] Date of Patent: Jul. 23, 1996

[54] APPARATUS AND METHOD FOR PROCESSING AND CUTTING STRUCTURAL CONCRETE

[75] Inventor: Kiyotoshi Okawauchi, Shizouka, Japan

[73] Assignee: Suruga Kogyo Ltd., Shizouka, Japan

[21] Appl. No.: 227,109

[22] Filed: Apr. 13, 1994

[51] Int. Cl.⁶ ............................................. B28D 5/00
[52] U.S. Cl. ...................... 125/15; 451/541; 451/547; 30/388; 83/835
[58] Field of Search .................. 125/12, 15; 451/540, 451/541, 544, 547; 30/388; 83/678, 835, 837, 838

[56] References Cited

U.S. PATENT DOCUMENTS

| | | | |
|---|---|---|---|
| 3,127,887 | 4/1964 | Metzger | 125/15 |
| 3,353,306 | 11/1967 | Seymour et al. | |
| 4,787,362 | 11/1988 | Boucher et al. | |
| 4,930,487 | 6/1990 | Younger | 125/15 |
| 5,184,597 | 2/1993 | Chiuminatta et al. | |
| 5,197,453 | 3/1993 | Messina | |

*Primary Examiner*—Maurina T. Rachuba
*Attorney, Agent, or Firm*—Thorpe North & Western

[57] ABSTRACT

An apparatus and method for processing and cutting structural concrete is disclosed in which the apparatus includes a first, larger cutting blade and at least one smaller cutting/finishing blade positioned adjacent to the larger cutting blade. The smaller blade have a beveled or concave cutting surface so that as the larger cutting blade forms cuts into the concrete, the smaller cutting/finishing blade rounds or bevels the edges of the cut. The rounded or beveled edges have a greater surface are and, therefore, additional strength to prevent chipping or cracking along the cuts. In the preferred embodiment, a smaller blade is positioned adjacent to each side of the larger blade to round or bevel both edges of the cut as the cut is formed by the larger blade. In accordance with one aspect of the invention, the above described apparatus can be used on previously made cuts in concrete to round or bevel the edges and avoid breakage or chipping.

15 Claims, 2 Drawing Sheets

5,537,987

APPARATUS AND METHOD FOR PROCESSING AND CUTTING STRUCTURAL CONCRETE

BACKGROUND OF THE INVENTION

1. Nature of the Invention

The present invention relates to an apparatus and method for processing and cutting structural concrete to prevent the concrete from chipping and cracking as it dries. In particular, the present invention relates to an apparatus and method for rounding or beveling the edges of cuts formed in structural concrete to prevent cracks so that the edges do not chip or split.

2. Summary of the Current Art

Concrete is commonly used for structural support and to form walls in schools, factories, office buildings and other structures. In many of these buildings, the concrete is left exposed and forms visible walls in such places as stairwells, hallways, and occasionally offices. When forming walls of concrete, however, a significant problem is raised by the fact that concrete contracts as it dries, occasionally causing cracks to form. To overcome this problem, cuts are made in the concrete. The cuts allow the concrete to dry or cure with minimal cracking. An life size example of such a cut is provided in FIG. 3. The concrete 100 is formed to have a surface 102. A cut 103 is made into the hardened concrete 101 perpendicular to the surface 102. If cracks do form in the concrete 100, they will occur at the bottom of cut 103, rather than at the surface 102.

While solving some of the appearance problem caused by cracks in the concrete 100, the cut 103 raises other concerns. Until now, a conventional concrete cutting blade has been used to make the cuts, like cut 103, into the concrete 100. These blades leave relatively sharp edges 104 at the opening of the cut 103. These sharp edges 104 have a small slope: and little structural support and, therefore are relatively weak. Thus, the edges 104 easily break and chip, leaving the concrete with a generally poor appearance.

In order to fix these problems, a method must be found which allows the cuts to be made into the structural concrete without leaving the edges of the cut weak and vulnerable to breaking and chipping. A solution to these problems is provided by the present invention which provides a method and apparatus for cutting into structural concrete in such a way as to create edges with more strength, thereby reducing or eliminating chips and breaks along the edges.

SUMMARY OF THE INVENTION

It is an object of the present invention to provide a method for processing structural concrete to leave stronger edges along cuts already made in the concrete so that the edges will not break or chip.

It is another object of the present invention to provide a method for making cuts in hardened structural concrete so as to provide stronger edges for each cut and prevent the edges from breaking or chipping.

It is yet another object of the present invention to provide an apparatus capable of cutting concrete so as to leave edges which are less prone to chipping and breakage.

It is yet another object of the present invention to provide an apparatus which can be used with conventional concrete cutting blades.

It is still another object of the present invention to provide an apparatus which can be used with conventional concrete cutting machines.

It is an additional object of the invention to produce concrete cuts with rounded or beveled edges.

The above and other objects of the invention are provided by a concrete cutting blade having an outer cutting surface (such as a conventional cutting blade) and at least one inner cutting/finishing edge disposed adjacent to a lateral side of the blade forming the outer cutting surface. The inner-cutting/finishing blade rotates about the same axis as the outer cutting surface and is of a smaller diameter so that as the outer cutting blade cuts a channel into the structural concrete, the inner cutting/finishing blade rounds or bevels at least one of the edges of the channel to give the edge a greater surface area and increase its strength.

In accordance with another aspect of the invention, an inner cutting/finishing blade is disposed on either side of the outer cutting blade so that as the cutting blade forms a cut into the structural concrete, the inner cutting/finishing blades round, or bevel both edges of the cut to give each edge more surface area, thereby increasing its strength. As a result of using the inner cutting/finishing blades, the cut concrete has a more attractive appearance and is more resistant to chipping and breaking than edges of the prior art.

In addition to being useful for cutting concrete, the inner cutting/finishing blades can also be used on existing cuts to decrease the risk of chipping and breakage and to increase the overall appearance of the channel's edges.

BRIEF DESCRIPTION OF THE DRAWINGS

The above and other objects, features and advantages of the invention will become apparent from a consideration of the following detailed description presented in connection with the accompanying drawings, in which.

DETAILED DESCRIPTION

Figure 1:
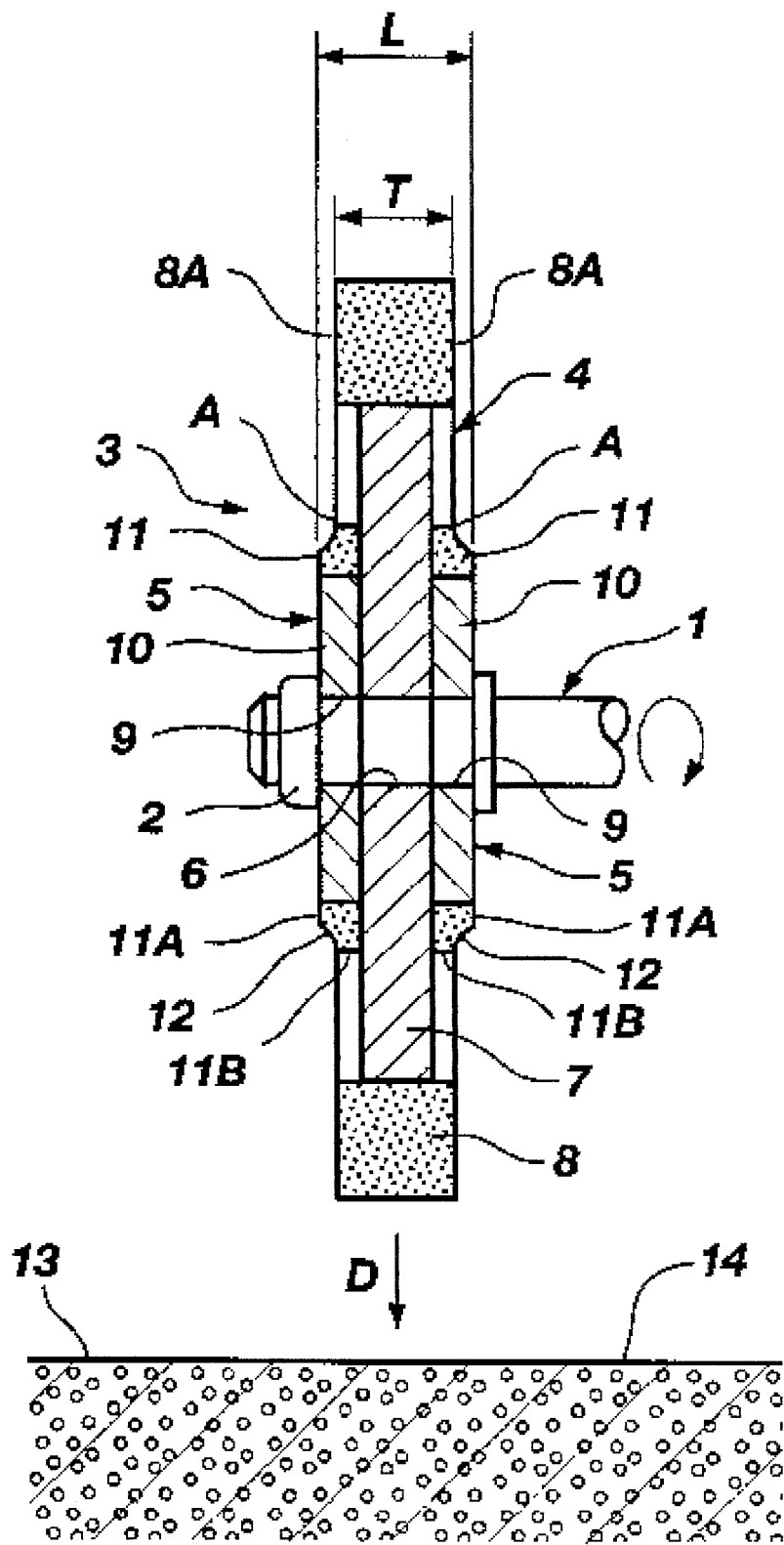
FIG. 1 shows front, cross-sectional view of a concrete cutting blade, made in accordance with the present invention, positioned above a slab of concrete.

Referring to FIG. 1, there is shown frontal, cross-sectional view of a cutting apparatus formed in accordance with the present invention. The cutting apparatus includes a first, larger cutting blade 3 connected to a shaft 1 which rotates the blade. The shaft 1 is driven by a motor (not shown). A nut 2 is used to secure the first, larger blade 3 to the shaft. 1 as the shaft passes through a hole 6 in the blade. The first, larger cutting blade 3 is formed from a generally circular metal plate 7 and a cutting surface 8 which is affixed to the circumference of the plate. When viewed in cross-section, the cutting surface 8 is almost square.

Also shown in FIG. 1 are two smaller cutting/finishing blades 5, one being positioned on each lateral side of the first, larger cutting blade 3. The smaller cutting/finishing blades 5 are formed from generally flat plates 10 of a similar size, and which have holes 9 in the center which line up with the hole 6 when placed about the shaft 1. An inner cutting surface 11 is formed about the circumference of each plate 10. Because the diameter of smaller cutting/finishing blades 5 is smaller than the distance between the extremes of cutting surface 8 of the larger cutting blade 3, the cutting surface 8 of the larger cutting blade will enter the concrete well before the cutting surfaces 11 of the smaller cutting/finishing blades contact the surface of the concrete 14.

Figure 2:
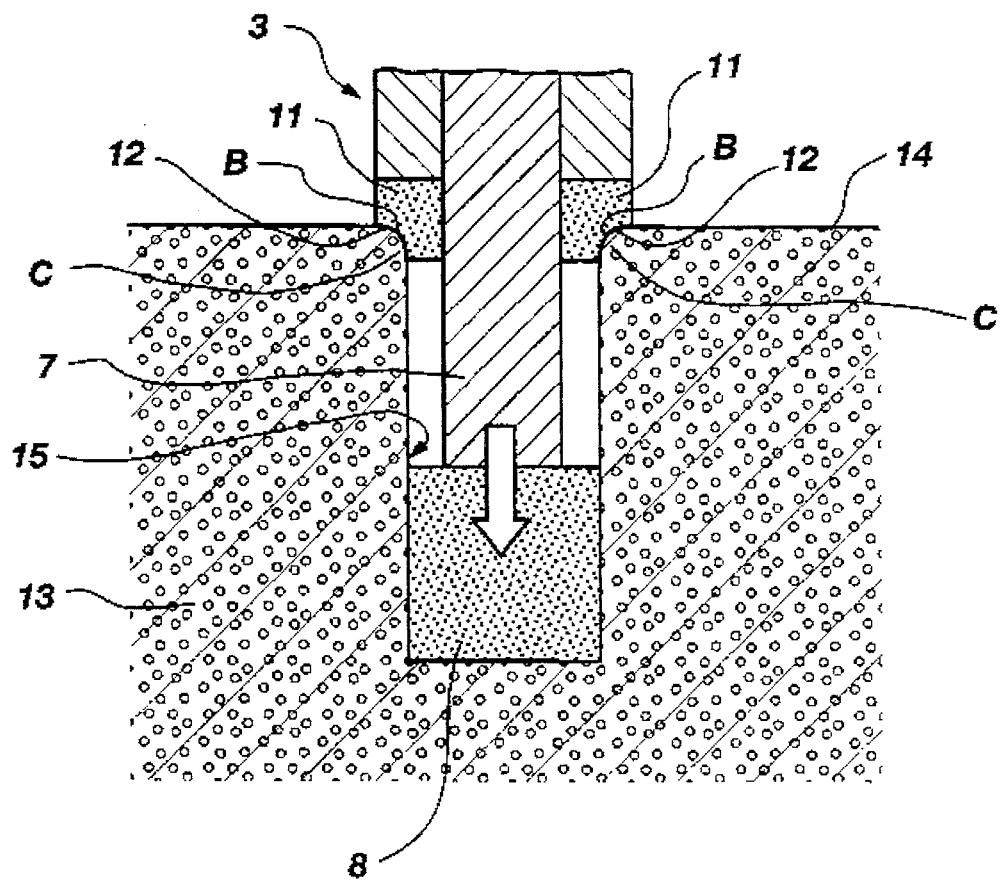
FIG. 2 shows an enlarged front, fragmented cross-sectional view of the cutting blade in which the blade is forming a cut in a slab of concrete in accordance with the principles of the present invention.
Figure 3:
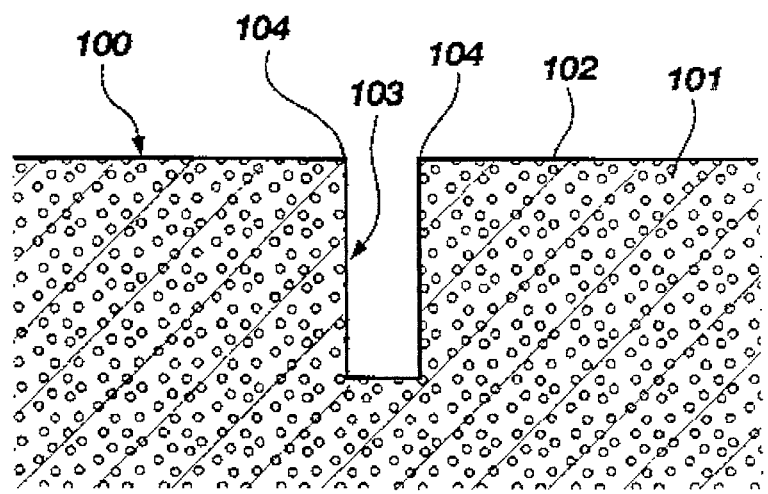
FIG. 3 shows a cut formed in structural concrete with relatively sharp edges formed with cutting blades having a single cutting blade, as is taught in the prior art.

The width L of the inner cutting surfaces 11 as measured horizontally between sides 11A—11A is wider than the width of the outer cutting surface 8, width T. Thus, the inner cutting surfaces 11 contact the edges (as shown in FIG. 2) formed in the concrete as the cut is formed by the outer cutting surface 8. Preferably, when rounding the edges, the inner cutting surface 11 will have a flat, horizontal section 11B which extends from the larger blade 3 to a point that is in the same vertical plane as the lateral sides 8A of the outer cutting surface 8. This is demonstrated by the line extending between side 8A and position A on the smaller cutting/finishing blades. The portion between position A and the side 11A of the inner cutting surface 11 is concave (shown in FIGS. 1 and 2). The concave portion 12 rounds the edges formed in the concrete as the outer cutting surface 8 penetrates the concrete surface. In addition to rounded edges, the cutting surfaces 11 can also be beveled to formed bevel edges along the cut.

While shown as three separate pieces of metal, the overall cutting blade could be formed of a single piece. The cutting surfaces 8 and 11 can be formed of conventional materials such as carbide, oxidized aluminum and ground industrial diamonds, or by cutting surface materials yet to be developed. The manufacture of such cutting surfaces are well known to those skilled in the art.

Referring to FIG. 2, there is shown of fragmented, enlarged frontal cross-sectional view of a cutting blade formed in accordance with the present invention. In use, the larger cutting blade 3 is rotated about the shaft 1 by a motor (not shown) so that the shaft is parallel to the concrete surface 14 and the blade is perpendicular to the concrete surface.

As the outer cutting blade 3 is lowered, the outer cutting surface 8 begins to cut the concrete 13. As the outer cutting blade 3 makes the cut deeper using the outer cutting surface 8, the inner cutting/finishing edges 11 begin to round or bevel the top edges of the cut with surface 12, which may be curved or beveled. This produces a cut 15, such as that shown in FIG. 2, in which the cut has rounded or beveled edges C such as rounded edge B. The edges created at C are of greater area than those created without use of the inner cutting/finishing edges 11. The curve of the inner cutting surface 12 creates an edge with strength comparable to a flattened edge.

The use of the cutting blade described herein increases work efficiency by creating rounded or beveled edges at the same time as making the cut. This saves processing time and costs as the rounding or beveling of the edges can be made at the same time as the cuts are being formed. Additionally, floors and walls incorporating the rounded or beveled cuts will resist chipping and breaking and will not need to be patched.

In the manner described above, an apparatus and method for processing and cutting concrete to reduce chipping and improve appearance is disclosed. It will be understood that other variations and modifications of the apparatus and method will be apparent to those skilled in the art without departing from the scope of the invention. The described apparatus and method are not meant to be a delineation of the scope of the invention, but merely an example of a present preferred embodiment and method.

What is claimed is:

1. An apparatus for processing and cutting a concrete surface, said apparatus comprising:

a first, larger cutting blade rotatable about an axis and having a first, larger diameter and circumference, said cutting blade comprising an outer concrete-cutting surface disposed about the circumference of the cutting blade, and a second, smaller cutting blade disposed adjacent to the first, larger cutting blade such that both blades are rotatable about the same axis, said second, smaller cutting blade comprising a second, smaller diameter and circumference, and an inner concrete-cutting surface disposed about the circumference of said second cutting blade and spaced between the axis and the outer concrete-cutting surface, said inner concrete-cutting surface defining an annular, sloped-nonconvex portion about the circumference of the second, smaller cutting blade so as to form a rounded/beveled edge at the concrete surface.

2. The concrete cutting and processing apparatus of claim 1 wherein the second, smaller cutting blade comprises a first generally vertical side disposed adjacent the first, larger cutting blade, and a second, generally vertical side disposed opposite the first generally vertical side, and wherein the first, generally vertical side is longer than the second generally vertical side.

3. The concrete cutting and processing apparatus of claim 1 further comprising an annular groove formed in the inner cutting surface of the second, smaller cutting blade.

4. The concrete cutting and processing apparatus of claim 1 wherein the inner cutting surface is beveled with respect to the second, smaller cutting blade, and wherein the second, smaller cutting blade is disposed such that the beveled inner cutting surface faces away from the first, larger cutting blade.

5. The concrete cutting and processing apparatus of claim 1 wherein the inner cutting surface comprises at least one of the group consisting of carbide, oxidized aluminum and diamonds.

6. The concrete cutting and processing apparatus of claim 1 further comprising a third, smaller cutting blade disposed adjacent to the first, larger cutting blade on a side opposite the second, smaller cutting blade so as to be rotatable about the same axis as the first and second cutting blades, the third, smaller cutting blade comprising a diameter, a circumference, and an inner cutting surface with an annular, sloped portion disposed about the circumference of said third, smaller cutting blade.

7. The concrete cutting and processing apparatus of claim 6 wherein the second and third cutting blades have common diameters.

8. The concrete cutting and processing apparatus of claim 6 wherein the second and third cutting blades each comprise an annular groove formed in the relative inner cutting surface of each cutting blade.

9. The concrete cutting and processing apparatus of claim 8 wherein each annular groove is generally round and begins at a point spaced from the first, larger cutting blade, and extends generally away from the first larger cutting blade.

10. The concrete cutting and processing apparatus of claim 9 wherein the outer cutting surface of the first, larger cutting blade has lateral sides which extend tangentially from the first, larger cutting blade such that the lateral sides of the cutting surface are positioned in a common plane to the beginning point of each annular groove.

11. The concrete cutting and processing apparatus of claim 6 wherein the first, second and third cutting blades comprise three separate pieces of metal.

12. The concrete cutting and processing apparatus of claim 1 wherein the first and second cutting blades comprise a single piece of material.

13. An apparatus for processing and cutting a hardened concrete surface, said apparatus comprising:

a first, larger cutting blade rotatable about an axis and having a first, larger diameter and circumference, said cutting blade comprising an outer concrete cutting surface disposed about the circumference of the cutting blade, the outer cutting surface having a generally rectangular cross-section, a second, smaller cutting blade disposed adjacent to the first, larger cutting blade such that both blades are rotatable about the same axis, said second, smaller blade comprising a second, smaller diameter and circumference, and an inner concrete cutting surface disposed about the circumference of said blade and spaced away from the outer cutting blade, said inner concrete cutting surface defining an annular, sloped-nonconvex portion about the circumference of the second, smaller cutting blade, and a third, smaller cutting blade disposed adjacent to the first, larger cutting blade on a side opposite the second, smaller cutting blade such that the first, second and third cutting blades are rotatable about the same axis, said third, smaller cutting blade having a common diameter and circumference with the second, smaller cutting blade, and an inner concrete cutting surface disposed about the circumference of said blade and spaced away from the outer concrete cutting surface, said inner concrete cutting surface defining an annular, sloped-nonconvex portion about the circumference of the third, smaller cutting blade, and wherein the sloped-nonconvex inner cutting surfaces of the second and third cutting blades are disposed so as to form rounded/beveled edges in the concrete surface when the apparatus is rotationally applied to the concrete.

14. The cutting apparatus of claim 13 wherein the first, larger cutting blade consists of a conventional cutting blade, and wherein the second and third, smaller cutting blades comprise metal disks held adjacent to lateral sides of the first, larger cutting blade.

15. A finishing blade for use with conventional concrete cutting blades, the blade comprising:

a generally circular metallic disc having first generally planar vertical side and a second generally planar vertical side opposite the first side and a sloped circumference extending between the first and second sides such that the first generally vertical side is longer than the second generally vertical side, a hole formed in the center tangential to each vertical side such that the disc may be rotated about the hole, the hole being of sufficient size to permit a shaft of a concrete cutting machine to be placed therein, and a concrete cutting surface disposed about the circumference of the disc, the cutting surface including a sloped, nonconvex surface extending annularly about the cutting surface.

* * * * *